United States Patent [19]
Menmuir et al.

[11] 3,947,859
[45] Mar. 30, 1976

[54] ELECTRIC CIRCUIT-BREAKER APPARATUS

[75] Inventors: John Menmuir, Pudsey; Kenneth Milford Faulkes, Horsforth, both of England

[73] Assignee: Lucas Aerospace Limited, Birmingham, England

[22] Filed: Oct. 23, 1974

[21] Appl. No.: 517,260

[30] Foreign Application Priority Data
Oct. 27, 1973 United Kingdom............. 50099/73

[52] U.S. Cl.......... 340/253 B; 307/127; 340/253 A; 340/253 Z
[51] Int. Cl.²...................................... G08B 21/00
[58] Field of Search........ 340/253 R, 253 A, 253 B, 340/253 E, 248 C, 176, 158, 160, 161, 188 CH, 205; 307/127, 138, 236; 328/118

[56] References Cited
UNITED STATES PATENTS
1,942,135   1/1934   Bushnell.................... 340/167 P FOREIGN PATENTS OR APPLICATIONS
647,724   7/1937   Germany............................ 340/176

Primary Examiner—John W. Caldwell
Assistant Examiner—Daniel Myer

[57] ABSTRACT

A remote-controlled circuit breaker apparatus has a pulse generator operable to provide a single output pulse. A change over switch is operable to select the polarity of the pulse applied to a conductor. A circuit breaker device has two electro-magnets arranged to be responsive to conductor pulses of respective opposite polarities to open and close the circuit breaker device. It is arranged that in the absence of a pulse, and with the circuit breaker device open a constant voltage signal appears on the conductor. A visual indicator is responsive to this signal to provide an open-circuit warning. The circuit breaker device also becomes open circuit in response to thermal overload, thereby causing the visual indicator to be energized.

15 Claims, 4 Drawing Figures

ELECTRIC CIRCUIT-BREAKER APPARATUS

This invention relates to electric circuit breaker apparatus.

It is known to provide electric circuit breaker apparatus which can be remotely controlled by means of electro-magnetic actuators, an indicating device being energized at the remote operating position when the circuit breaker is in one of its operated conditions.

Such known apparatus requires at least two conductors interconnecting the operating position and the circuit breaker device itself, one of these conductors carrying the operating or control signals, and the other carrying signals to energise the indicating device. Where a very large number of circuit breaker devices are to be operated from a single operating position, the resulting number of interconnecting conductors can impose severe penalties with regard to space, and particularly in the case of aircraft, a weight penalty in addition.

It is an object of the present invention to provide a remotely controlled circuit breaker apparatus in which a single connecting cable serves for both the control and indication signals.

According to the invention a remotely controllable circuit breaker apparatus comprises means for generating electrical control pulses of substantially constant duration and current, a conductor along which said control pulses can pass, a change-over switch operable to select the polarity of said pulses applied to said conductor, a circuit breaker device including a first contact element movable to an open circuit position in response to the heating effect of a current therethrough, a second contact element movable with said first element and respectively open and closed in closed and open positions of said first element, and an electromagnetic actuator arrangement responsive to respective opposite polarities of pulses in said conductor to open and close said first contact element, said second contact element being operable, in one of its positions and in the absence of a control pulse, to apply a voltage signal to said conductor, and said apparatus further includes an indicator device responsive to said voltage signal.

Examples of the invention will now be described with reference to the accompanying drawings, in which.

Figure 1:
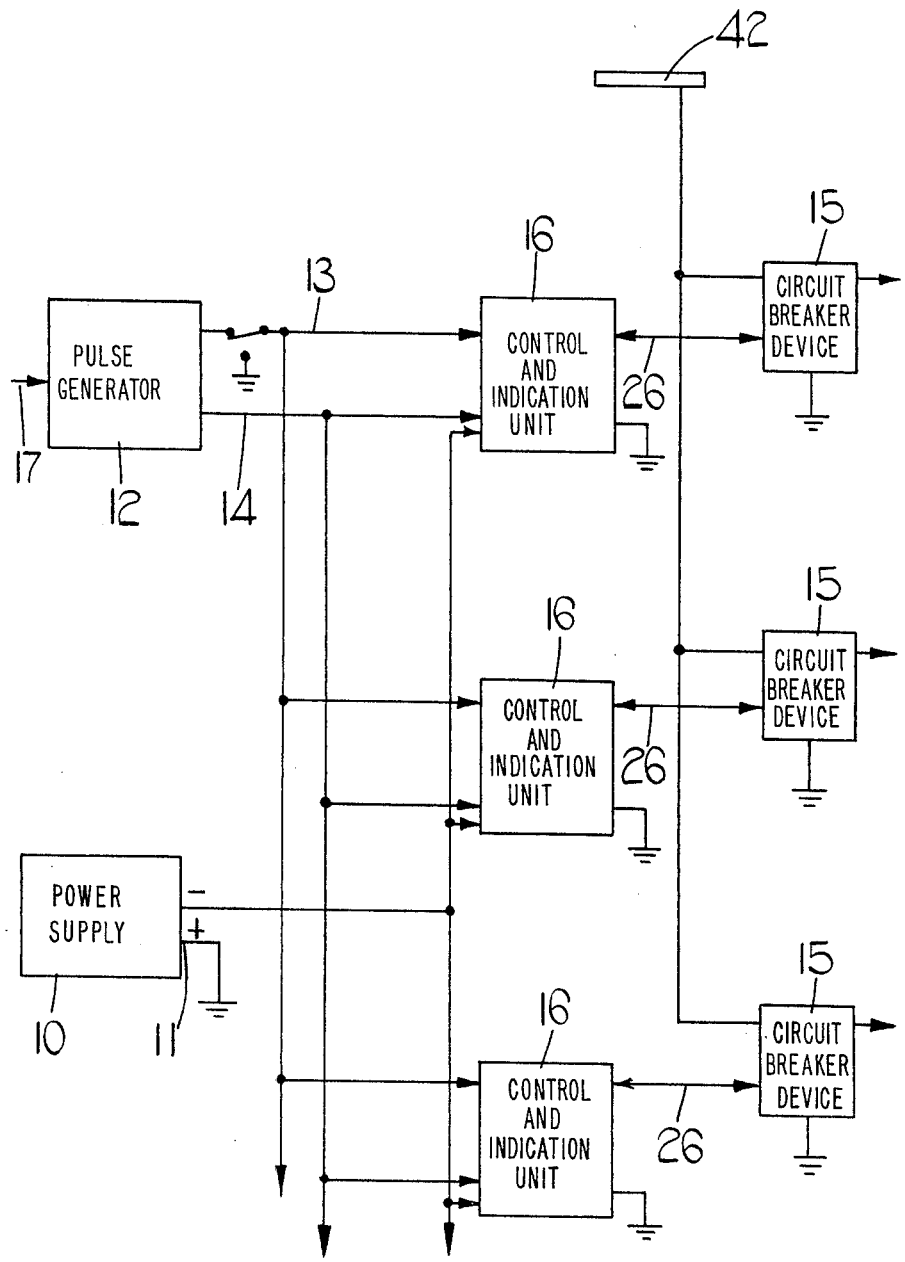
FIG. 1 is a block diagram of an arrangement including several circuit breakers.
Figure 2:
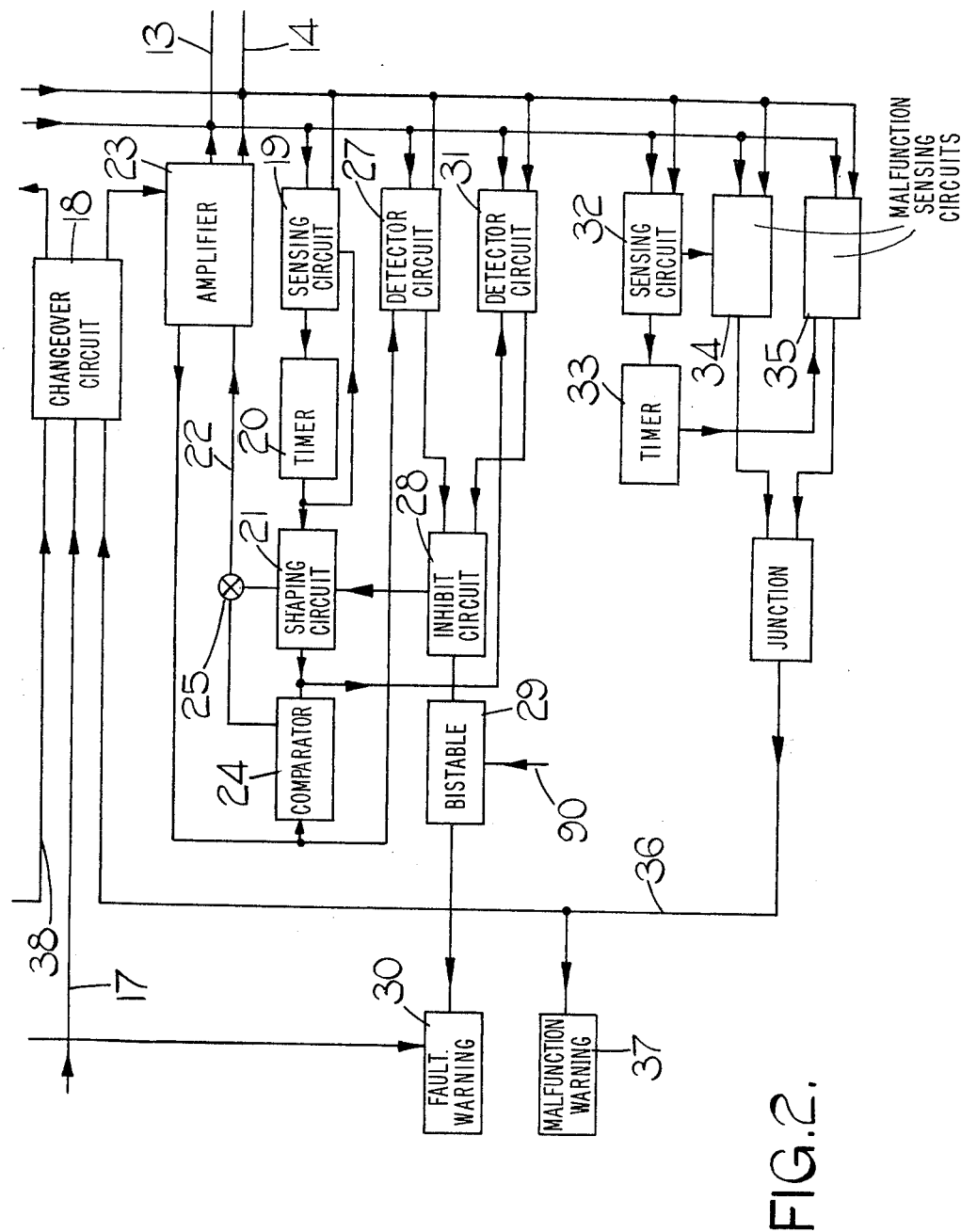
FIG. 2 shows a block diagram of a pulse generator forming part of the arrangement of FIG. 1.

The arrangement shown in FIG. 1 has a −15 volt D.C. power supply system 10 having its positive terminal 11 connected to earth. A generator 12, later to be described in detail with reference to FIG. 2, is arranged to supply, on lines 13, 14, pulses which are respectively positive-going and negative-going. The pulses on lines 13, 14 are arranged to have constant durations of 30 milliseconds and constant current amplitudes of 4 amps.

Figure 3:
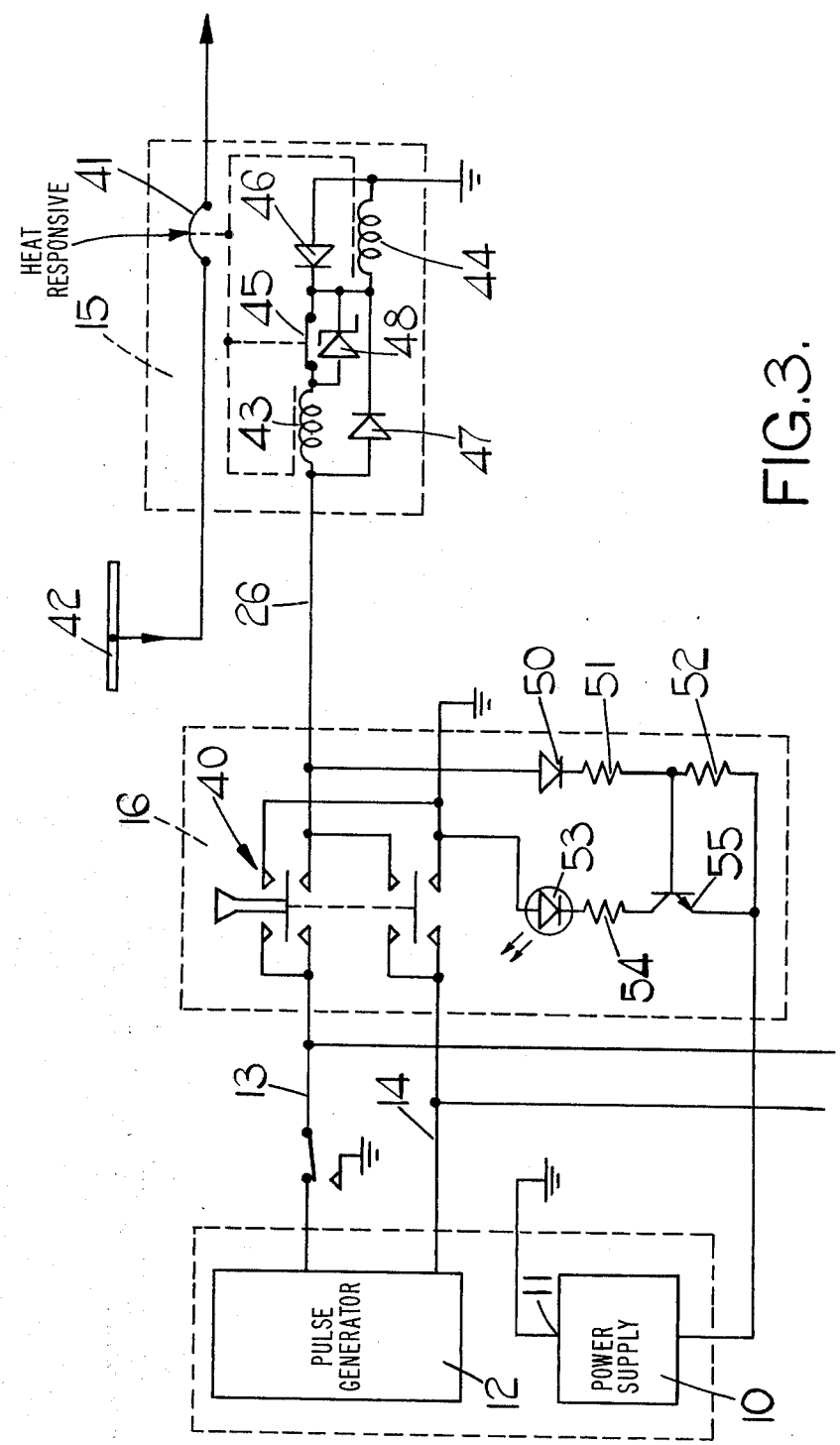
FIG. 3 shows part of a circuit breaker apparatus according to the invention.
Figure 4:
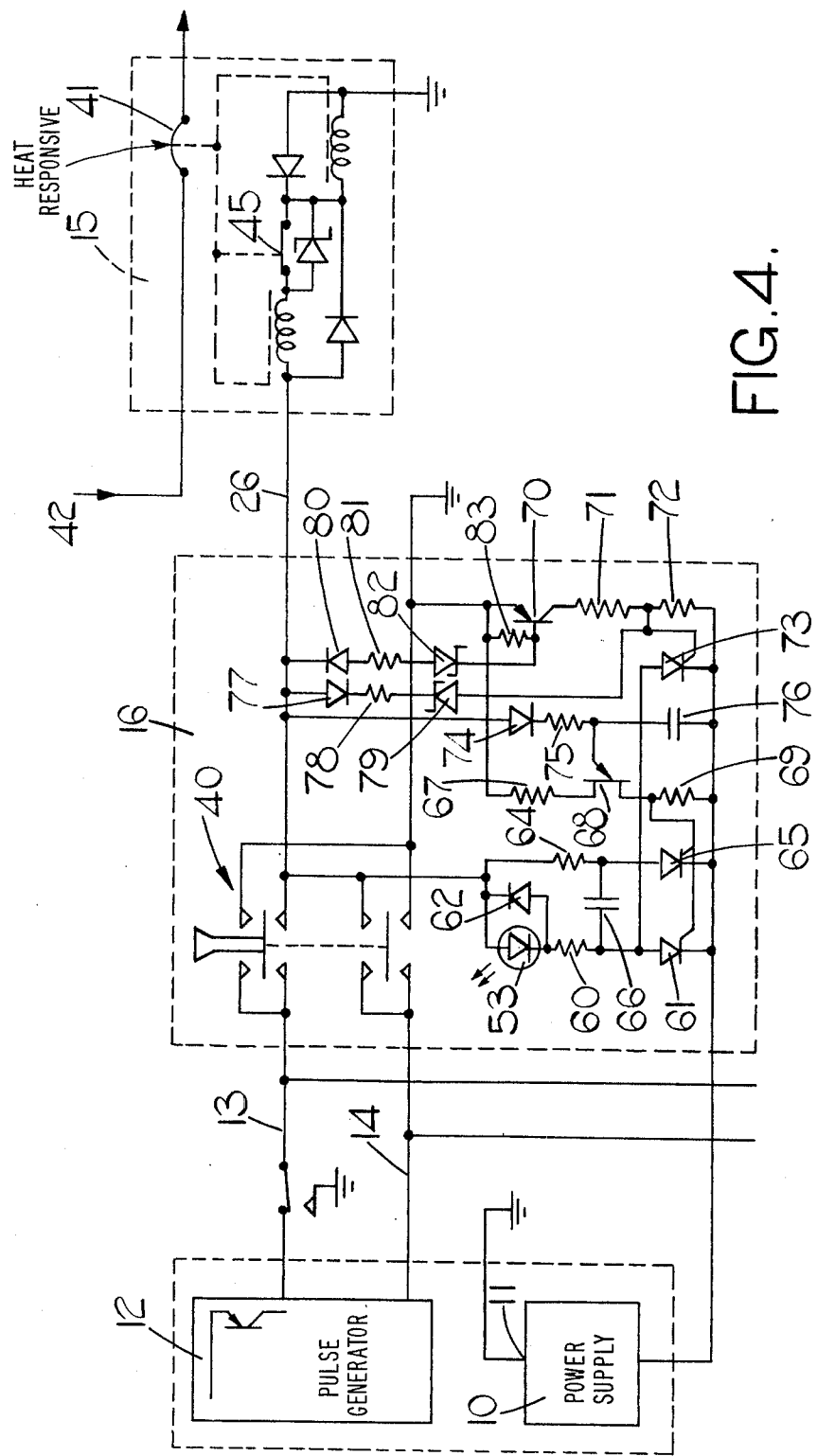
FIG. 4 shows an alternative form of the apparatus of FIG. 3.

A plurality of circuit-breaker devices 15, shown in details in FIGS. 3 and 4, are arranged to control the supply of current from a main power bus-bar 42 to respective ones of a corresponding number of external loads (not shown). Devices 15 are responsive to pulses on conductors 26 from the generator 12, supply of these pulses being controlled by respective control and indication units 16. Units 16 are powered by the supply system 10 and include indicator lamps which provide a signal when the corresponding ones of circuit breaker devices 15 are open-circuit, with respect to the external loads.

As shown in FIG. 2 the pulse generator 12 is powered via a line 17 from a voltage source separate from the system 10. The generator 12 comprises, in fact, two identical pulse generator arrangements, only one of which is shown, these two arrangements being selectively energisable by means of a change-over circuit 18 to which the power on line 17 is supplied.

A sensing circuit 19 is responsive to an earth potential on either of lines 13, 14 to provide control signals to a timer 20. The timer 20 then activates the remainder of the pulse generator 12 for a period which is slightly longer than that of the pulse being generated. A pulse forming and shaping circuit 21 is responsive to the output from the timer 20 to provide an appropriate pulse on a line 22 to a power output amplifier 23, from whence the positive-going pulses pass to output line 13. A feedback signal from the output amplifier 23 is supplied to a comparator 24 which is also responsive to the output of the forming and shaping circuit 21. The output of comparator 24 is combined with that of circuit 21 in a summing junction 25, so that signal on line 22 maintains the amplitude, shape and width of the output pulses substantially constant.

A detector circuit 27 is responsive to a short circuit between the lines 13 and 14, or between any selected conductor 26 and earth, to provide a control signal to an inhibit circuit 28 which stops operation of the pulse forming circuit 21 and, by setting a bistable element 29, energizes a fault warning device 30. Device 30 is also responsive to a similar part of the corresponding duplicate arrangement.

A further detector circuit 31 is responsive to an open circuit on any selected conductor 26, and similarly operates to inhibit operation of the pulse forming circuit 21 and provide a fault warning. The fault warning device 30 can be reset by means of a reset signal applied via a line 90 to bistable element 29.

A further sensing circuit 32 and a timer 33, identical with circuits 19, 20 respectively, are responsive to operation of a change-over switch 40 in any of the control and indication units 16. Circuit 32 and timer 33 provide signals to respective malfunction sensing circuits 34, 35. Circuits 34, 35 are both responsive to the output from power amplifier 23. If, after energisation of sensing circuit 32 there is no corresponding pulse from amplifier 23, circuit 34 provides a signal on a line 36 which causes change-over circuit 18 to energize the other of the pulse generator arrangements. The signal on line 36 also energizes a malfunction warning device 37.

If, after energisation of circuit 32 and timer 33, the output of power amplifier 23 is maintained for longer than the period set by timer 33, circuit 35 similarly provides a signal on line 36 to energize device 37 and to bring the other pulse generator arrangement into operation.

Change-over circuit 18 may be operated manually to select either one of the two indentical pulse generator arrangements. Circuit 18 is also responsive to a signal on a line 38, corresponding to line 36, if the aforesaid other pulse generator arrangement malfunctions.

As shown in FIG. 3 the change-over switch 40 in unit 16 is operable to connect either one of lines 13 or 14 to the associated conductor 26 and to connect the other of these lines to earth. Switch 40 is biased to a center-off position (shown), to which position it returns when not subject to any operating force. The circuit breaker device 15 includes a main contact element 41 which can trip, in response to the heating effect of a current passing therethrough, to isolate the associated load from bus-bar 42. Element 41 may also be tripped by energisation of a solenoid 43, or closed by energisation of a solenoid 44. Device 15 further includes an auxiliary contact element 45 which is movable with the main element 41 and which is closed to complete a control circuit when element 41 is tripped open.

Element 45 is connected in series between solenoid 43 and the cathode of a diode 46 whose anode is connected to earth. The terminal of solenoid 43 remote from element 45 is connected to conductor 26. A diode 47 is connected in series with solenoid 44 between conductor 26 and earth, diode 47 being connected so that a positive voltage on conductor 26 can cause current flow in solenoid 44. The cathodes of diodes 46, 47 are interconnected and auxiliary contact element 45 is shunted by a Zener diode 48 which has a breakdown voltage of 15 volts to permit current flow from earth to conductor 26 via solenoid 43.

Control and indicator unit 16 includes a diode 50 and two resistors 51, 52 connected in series between the conductor 26 and the negative terminal of the −15 volt supply 10, the arrangement being such that current can flow when conductor 26 is more positive than −15 volts. Connected in series between earth and the −15 volt terminals are a light-emitting diode 53, a resistor 54 and an n-p-n transistor 55. The base of transistor 55 is connected to the junction of resistors 51, 52.

In use, assume contact element 41 is open circuit, element 45 thus being closed. Operation of switch 40 to connect line 13 to conductor 26 also earths line 14. The earth potential on line 14 initiates operation of the pulse generator 12, which delivers a single positive-going pulse on conductor 26. The positive pulse on conductor 26 causes current flow through diode 47, which effectively shorts out solenoid 43, and through solenoid 44 to close contact element 41 and open element 45. After this pulse has ceased current flow from earth via Zener diode 48, diode 50 and resistors 51, 52 to the −15 volt terminal, since the total voltage which will be required to break down Zener diode 48 and to bias the diode 50 is greater than 15 volts. There is thus no voltage to bias transistor 55 on, and the light-emitting diode 53 remains unenergized.

If switch 40 is now operated to connect line 14 to conductor 26 and line 13 to earth, the consequent negative pulse on conductor 26 causes current flow through diode 46, which shorts out solenoid 44, and through Zener diode 48 and solenoid 43 to open contact element 41 and close element 45. Zener diode 48 is thereby shorted and, after the negative pulse, current can flow through diode 50 and resistors 51, 52. Transistor 55 is biased on and light-emitting diode 53 is energized.

If contact element 41 is opened as a result of current overload, the light-emitting diode 53 is energized in the same way as if element 41 had been operated by switch 40. Operation of switch 40 in an attempt to close contact element 41, while a current overload condition continues is ineffective, element 41 being maintained open by its thermal response.

FIG. 4 shows an apparatus having a modified form of control and indicator unit 16, parts corresponding to the unit 16 shown in FIG. 3 being allocated identical numbers. The light-emitting diode 53 is connected, in series with a resistor 60 and a silicon controlled rectifier (S.C.R.) 61, between conductor 26 and the −15 volt terminal of supply system 10, the arrangement being that a forward bias applied to S.C.R. 61 permits current flow through diode 53 from conductor 26 to the −15 volt terminal. Diode 53 is shunted by a diode 62 which permits current flow in the opposite direction.

A further resistor 64 and a further S.C.R. 65 are arranged in series and are connected in parallel with diode 53, resistor 60 and S.C.R. 61. A capacitor 66 is connected between the anodes of S.C.R.'s 61, 65. Connected between earth and the −15 volt terminal of supply systems 10 are a series arrangement of a resistor 67, a unijunction transistor 68 and a resistor 69. Also connected between earth and the −15 volt terminal is yet another series arrangement of a p-n-p transistor 70, and two resistors 71, 72.

The gates of S.C.R.'s 61, 65 are commonly connected to the connection between transistor 68 and resistor 69. A further S.C.R. 73 is connected in parallel with S.C.R. 61 and has its gate connected to the junction of resistors 71, 72.

A diode 74, a resistor 75 and a capacitor 76 are connected in series between conductor 26 and the −15 volt supply terminal of system 10. The emitter of unijunction transistor 68 is connected to the common connection of resistor 75 and capacitor 76.

A diode 77, a resistor 78 and a Zener diode 79 are connected in series between conductor 26 and the gate of S.C.R. 73, the arrangement being such that a positive voltage on conductor 26 causes current flow via resistor 72 to the −15 volt terminal of supply system 10. A diode 80, a resistor 81 and a Zener diode 82 are connected in series between the conductor 26 and the base of transistor 70, the arrangement being such that a negative voltage on conductor 26 renders the base of transistor 70 negative. A resistor 83 is connected between the base and emitter of transistor 70.

In use, assume contact element 41 is closed, element 45 thus being open circuit. There is thus no voltage on conductor 26 and neither transistor 68 nor transistor 70 conducts. The S.C.R.'s 61, 65, 73 have no supply voltage and the light-emitting diode 53 is not energised.

If switch 40 is operated to provide a negative-going pulse on conductor 26, opening contact element 41 and closing element 45, this pulse causes transistor 70 to conduct. After the pulse on line 26 has ceased, line 26 reverts to earth potential. However, the response-time of transistor 70 causes S.C.R. 73 to remain forward-biased until this earth potential is established on line 26. S.C.R 73 thus conducts and the light-emitting diode 53 remains energised while the earth potential remains on line 26.

If, however, contact element 41 opens as a result of thermal overload, there is, on conductor 26, as above described, a voltage which is positive with respect to the negative terminal of supply system 10. This positive voltage passes via diode 74 to charge capacitor 76 at a rate depending on the value of resistor 75. At a critical voltage transistor 68 conducts, discharging capacitor 76 and rendering transistor 68 once again open circuit.

There are thus a series of equi-spaced pulses applied to the gates of S.C.R.'s 61, 65, which combine with resistors 60, 64 and capacitor 66 to form a bistable network, as follows.

A pulse across resistor 69 switches S.C.R. 61 on, energizing the light-emitting diode 53 and charging capacitor 66 so that the anode of S.C.R. 65 is at earth potential. The next subsequent pulse across resistor 69 switches S.C.R. 65 on, reducing its anode to −15 volts and momentarily (since capacitor 66 has not had time to discharge) placing −30 volts on the anode of S.C.R. 61. S.C.R. 61 thus switches off, extinguishing diode 53. Diode 53 thus flashes as long as the positive voltage remains on conductor 26.

If, with element 41 open as a result of thermal overload, a positive-going pulse is then applied by switch 40 to conductor 26, this pulse passes via diode 77, resistor 78 and Zener diode 79 to forward-bias S.C.R. 73. The thermal overload causes element 41 to remain open, and element 45 to remain closed. The earth potential remaining on conductor 26, after the switching pulse, causes S.C.R. 73 to remain switched on, and light-emitting diode is continuously energized.

We claim:

1. A remotely-controllable circuit breaker apparatus comprising means responsive to an input signal for generating a single electrical control pulse of known duration and current, a conductor along which said control pulse can pass, switch means for selecting the polarity of said pulse applied to said conductor, said switch means including means, responsive to each operation of said switch means, for applying said input signal to said pulse-generating means, a circuit breaker device including a first contact element movable to an open circuit position in response to the heating effect of a current therethrough, a second contact element movable in unison with said first element and being respectively open and closed in closed and openn positions of said first element, and an electro-magnetic actuator means responsive to pulses of respective opposite polarities in said conductor for setting said first contact element in respective open and closed positions, said second contact element being operable, when in one of its operating positions and in the absence of a control pulse, to apply a voltage signal to said conductor, said circuit breaker apparatus further including an indicator device connected to said conductor and responsive to said voltage signal.

2. An apparatus as claimed in claim 1 in which said actuator arrangement comprises a first actuator element operable to close said first contact element, a second actuator element in parallel with said first actuator element and operable to open said first contact element, and first and second diodes in series with said first and second actuator elements respectively, whereby said contact elements are energisable in response to respective opposite polarities of said pulses.

3. An apparatus as claimed in claim 2 in which said second contact element is connected in series between one of said actuator elements and the one of said diodes with which said one actuator element is in series, and a Zener diode is connected across said second contact element, said Zener diode being connected so as to breakdown and cause said one actuator element to be energized in response to a pulse of negative polarity on said conductor.

4. An apparatus as claimed in claim 3 in which said one actuator element is provided by said second actuator element.

5. An apparatus as claimed in claim 1 in which said indicator device comprises an indicating element and switching means responsive to said voltage signal to cause said indicating element to be energized.

6. An apparatus as claimed in claim 5 in which said switching means includes a bistable circuit responsive to said voltage signal to energize said indicating element intermittently.

7. An apparatus as claimed in claim 6 in which said voltage signal is provided by an earth potential.

8. An apparatus as claimed in claim 6 which includes means responsive to said voltage signal for generating a plurality of pulses, and in which said bistable circuit comprises a pair of switch devices respectively operable by alternate ones of said plurality of pulses, one of said switch devices being in series with said indicator device, and the other of said switch devices shunting said indicator device.

9. An apparatus as claimed in claim 6 in which said indicator device includes a further switching means responsive to a pulse of one polarity on said conductor to energise said indicator element continuously.

10. An apparatus as claimed in claim 9 in which said further switching means is also responsive to a pulse of the other polarity to energize said indicator element continuously.

11. An apparatus as claimed in claim 5 in which said indicating element is a light-emitting diode.

12. An apparatus as claimed in claim 1 in which said generating means has two output terminals at respective ones of which control pulses of opposite polarity are provided, and in which said change-over switch is operable to connect a selected one of said terminals to said conductor and to connect the other of said terminals to a reference voltage.

13. An apparatus as claimed in claim 12 in which said generating means is responsive to said reference voltage on said other terminal to provide a control pulse at said one terminal.

14. An apparatus as claimed in claim 1 which includes a d.c. power supply system having one terminal connected to said circuit breaker actuator arrangement and the other terminal connected to said indicator device.

15. An apparatus as claimed in claim 1 which includes a plurality of said conductors, a plurality of said change-over switches, a plurality of circuit breaker devices and a plurality of indicator devices.

* * * * *